US012664633B2

(12) United States Patent
Lim

(10) Patent No.: US 12,664,633 B2
(45) Date of Patent: Jun. 23, 2026

(54) APPARATUS AND METHOD FOR EXTRACTING QUALITATIVE CHARACTERISTICS OF VIDEO

(71) Applicant: ELECTRONICS AND TELECOMMUNICATIONS RESEARCH INSTITUTE, Daejeon (KR)

(72) Inventor: Ji Youn Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 325 days.

(21) Appl. No.: 18/377,467

(22) Filed: Oct. 6, 2023

(65) Prior Publication Data

US 2024/0127415 A1 Apr. 18, 2024

(30) Foreign Application Priority Data

Oct. 7, 2022 (KR) ........................ 10-2022-0129092
Apr. 27, 2023 (KR) ........................ 10-2023-0055750

(51) Int. Cl.
*G06T 7/00* (2017.01)
*G06T 7/13* (2017.01)
(Continued)

(52) U.S. Cl.
CPC .............. *G06T 7/0002* (2013.01); *G06T 7/13* (2017.01); *G06T 11/26* (2026.01); *G06V 10/44* (2022.01);
(Continued)

(58) Field of Classification Search
CPC ......... G06T 11/206; G06T 2207/10024; G06T 2207/30168; G06T 7/0002; G06T 7/13;
(Continued)

(56) References Cited

U.S. PATENT DOCUMENTS 11,368,705 B2    6/2022  Wang et al.
11,941,746 B2 *  3/2024  Hertzmann ........... G06T 17/205
(Continued)

FOREIGN PATENT DOCUMENTS

KR    10-2009-0131626 A    12/2009
KR        10-2293073 B1    8/2021

OTHER PUBLICATIONS

Sen-Ching S. Cheung et al., "Fast Similarity Search and Clustering of Video Sequences on the World-Wide-Web", IEEE Transactions on Multimedia, vol. 7, No. 3, Jun. 2005.
(Continued)

*Primary Examiner* — Chineyere Wills-Burns
(74) *Attorney, Agent, or Firm* — LRK PATENT LAW FIRM

(57) ABSTRACT

A method, a device and a recording medium for extracting a qualitative characteristic of a video may include segmenting a video into at least one video segment, and based on an edge representing a relationship between objects of the video segment and the objects, generating video graph sequences in a graph form of the video segment, and generation of the video graph sequences may be performed based on an object feature vector expressing a qualitative characteristic of the objects as a vector and an edge feature vector expressing a qualitative characteristic of the edge as a vector.

16 Claims, 9 Drawing Sheets

Style Database

Search Engine

User Interface

(51) Int. Cl.

| | |
|---|---|
| *G06T 11/26* | (2026.01) |
| *G06V 10/44* | (2022.01) |
| *G06V 10/54* | (2022.01) |
| *G06V 10/764* | (2022.01) |
| *G06V 20/40* | (2022.01) |
| *G06V 20/70* | (2022.01) |

(52) U.S. Cl.
CPC ............ *G06V 10/54* (2022.01); *G06V 10/764* (2022.01); *G06V 20/49* (2022.01); *G06T 2207/10024* (2013.01); *G06T 2207/30168* (2013.01)

(58) Field of Classification Search
CPC ...... G06V 10/44; G06V 10/54; G06V 10/764; G06V 20/49; G06V 20/70
See application file for complete search history.

(56) References Cited

U.S. PATENT DOCUMENTS

| | | | | |
|---|---|---|---|---|
| 2002/0176625 | A1* | 11/2002 | Porikli | G06T 7/215 |
| | | | | 382/173 |
| 2003/0118214 | A1* | 6/2003 | Porikli | G06V 40/162 |
| | | | | 382/107 |
| 2009/0080853 | A1* | 3/2009 | Chen | G06F 16/786 |
| | | | | 386/242 |
| 2011/0148897 | A1* | 6/2011 | Wong | G06T 11/10 |
| | | | | 382/199 |
| 2014/0233915 | A1* | 8/2014 | Middleton | G11B 27/031 |
| | | | | 386/282 |
| 2016/0379055 | A1* | 12/2016 | Loui | G06F 18/2323 |
| | | | | 382/103 |
| 2018/0295375 | A1* | 10/2018 | Ratner | G06T 7/12 |
| 2020/0302185 | A1* | 9/2020 | Hussein | G06N 3/084 |
| 2020/0302231 | A1* | 9/2020 | Nawhal | G06N 3/0475 |
| 2021/0158536 | A1* | 5/2021 | Li | G06T 7/20 |
| 2021/0248375 | A1* | 8/2021 | Geng | G06N 3/0455 |
| 2023/0065773 | A1* | 3/2023 | Dimitriou | G06V 10/454 |
| 2023/0306489 | A1* | 9/2023 | Kong | G06N 5/04 |

OTHER PUBLICATIONS

Junbin Xiao et al., "Video as Conditional Graph Hierarchy for Multi-Granular Question Answering", The Thirty-Sixth AAAI Conference on Artificial Intelligence (AAAI-22), 2022, vol. 36, No. 3, pp. 2804-2812.

Xiaolong Wang et al., "Videos as Space-Time Region Graphs", ECCV 2018.

* cited by examiner

Figure 7:
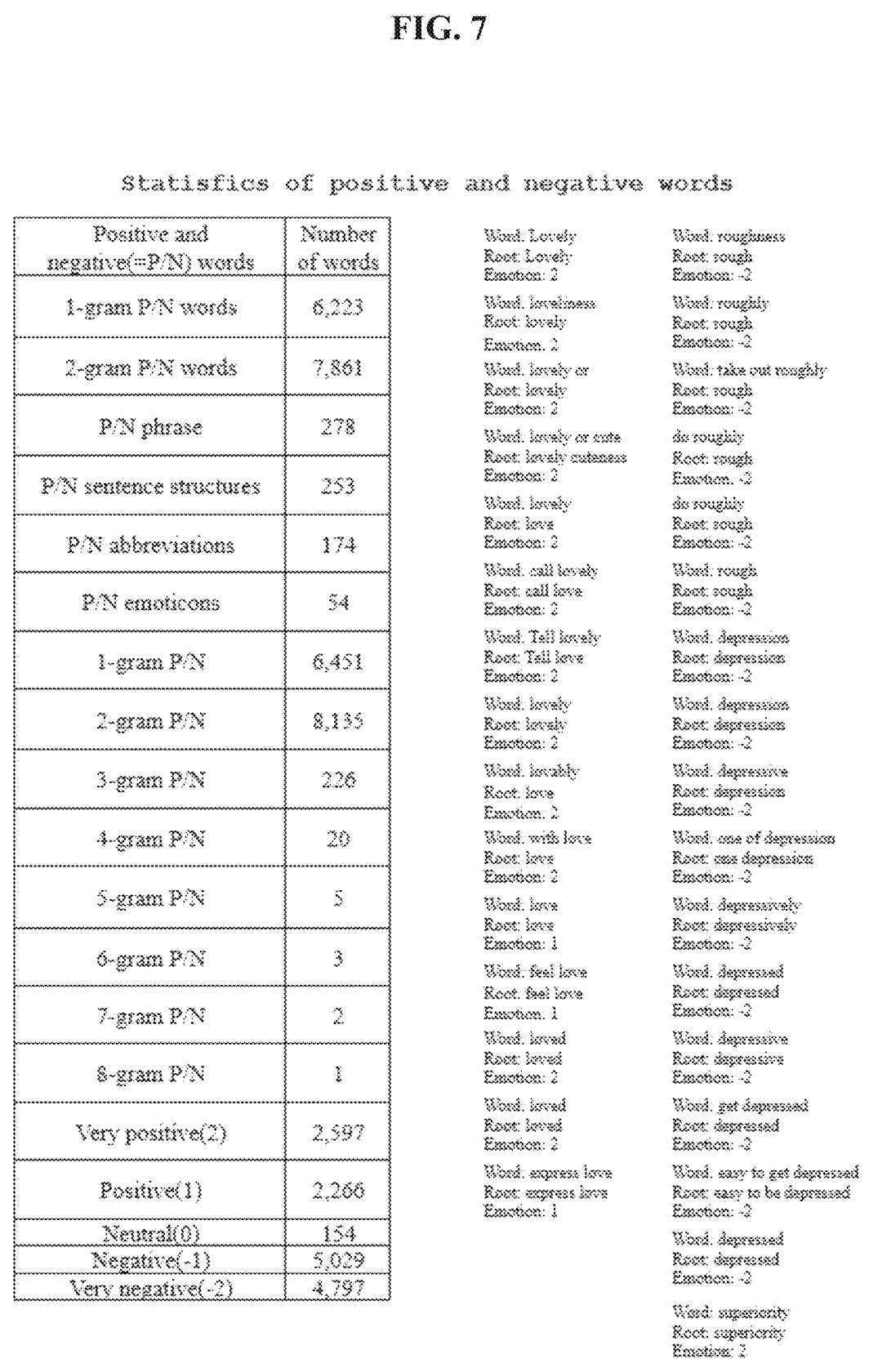

Statisfics of positive and negative words

| Positive and negative(=P/N) words | Number of words |
|---|---|
| 1-gram P/N words | 6,223 |
| 2-gram P/N words | 7,861 |
| P/N phrase | 278 |
| P/N sentence structures | 253 |
| P/N abbreviations | 174 |
| P/N emoticons | 54 |
| 1-gram P/N | 6,451 |
| 2-gram P/N | 8,135 |
| 3-gram P/N | 226 |
| 4-gram P/N | 20 |
| 5-gram P/N | 5 |
| 6-gram P/N | 3 |
| 7-gram P/N | 2 |
| 8-gram P/N | 1 |
| Very positive(2) | 2,597 |
| Positive(1) | 2,266 |
| Neutral(0) | 154 |
| Negative(-1) | 5,029 |
| Very negative(-2) | 4,797 |

Word: Lovely
Root: Lovely
Emotion: 2

Word: loveliness
Root: lovely
Emotion: 2

Word: lovely or
Root: lovely
Emotion: 2

Word: lovely or cute
Root: lovely cuteness
Emotion: 2

Word: lovely
Root: love
Emotion: 2

Word: call lovely
Root: call love
Emotion: 2

Word: Tall lovely
Root: Tall love
Emotion: 2

Word: lovely
Root: lovely
Emotion: 2

Word: lovably
Root: love
Emotion: 2

Word: with love
Root: love
Emotion: 2

Word: love
Root: love
Emotion: 1

Word: feel love
Root: feel love
Emotion: 1

Word: loved
Root: loved
Emotion: 2

Word: loved
Root: loved
Emotion: 2

Word: express love
Root: express love
Emotion: 1

Word: roughness
Root: rough
Emotion: -2

Word: roughly
Root: rough
Emotion: -2

Word: take out roughly
Root: rough
Emotion: -2 do roughly
Root: rough
Emotion: -2 do roughly
Root: rough
Emotion: -2

Word: rough
Root: rough
Emotion: -2

Word: depression
Root: depression
Emotion: -2

Word: depression
Root: depression
Emotion: -2

Word: depressive
Root: depression
Emotion: -2

Word: one of depression
Root: one depression
Emotion: -2

Word: depressively
Root: depressively
Emotion: -2

Word: depressed
Root: depressed
Emotion: -2

Word: depressive
Root: depressive
Emotion: -2

Word: get depressed
Root: depressed
Emotion: -2

Word: easy to get depressed
Root: easy to be depressed
Emotion: -2

Word: depressed
Root: depressed
Emotion: -2

Word: superiority
Root: superiority
Emotion: 2

FIG. 9

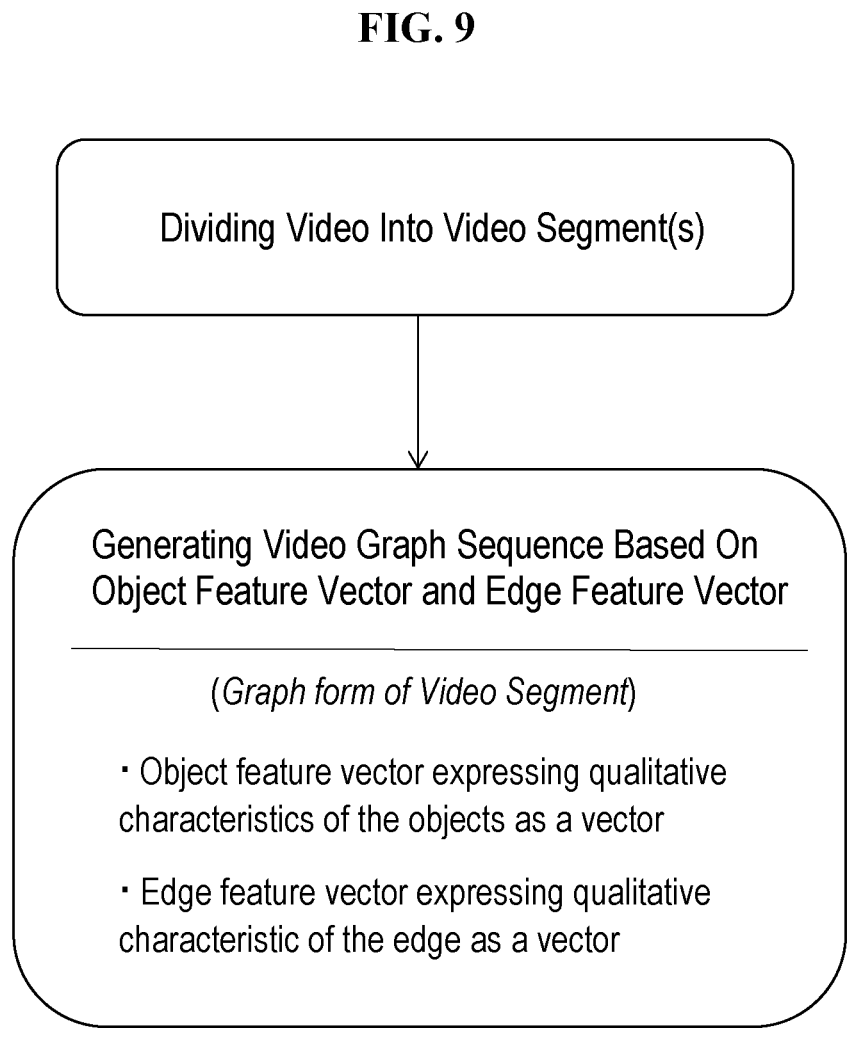

Dividing Video Into Video Segment(s)

Generating Video Graph Sequence Based On
Object Feature Vector and Edge Feature Vector

*(Graph form of Video Segment)*

· Object feature vector expressing qualitative
characteristics of the objects as a vector · Edge feature vector expressing qualitative
characteristic of the edge as a vector

APPARATUS AND METHOD FOR EXTRACTING QUALITATIVE CHARACTERISTICS OF VIDEO

CROSS-REFERENCE TO RELATED APPLICATIONS

This application claims the benefit of earlier filing date and right of priority to Korean Application NO. 10-2022-0129092, filed on Oct. 7, 2022, and priority to Korean Application NO. 10-2023-0055750, filed on Apr. 27, 2023, the contents of which are all hereby incorporated by reference herein in their entirety.

BACKGROUND

1. Technical Field

The present disclosure relates to a method and a device of extracting a qualitative characteristic of a video, e.g., a way of developing a story structure or a social or aesthetic characteristic of a visual element and others.

A conventional technology has developed in a direction of understanding a context such as composition of a video story. However, a social and aesthetic characteristic of a video which may be described by an arrangement method of an object, a color of an object, etc. in a video has a significant impact on consumers' desire to consume. In reference to 'An Impact of the Character Image Implementation Elements on Viewing Immersion and Behavioral Intention Focusing on the Korean Film' in Journal of the Korean Society of Cosmetology [written by Seo-Hyun Lee and Oh-Hyeok Kwon (2022)], it showed that how a character is expressed in a Korean film has a positive impact on viewing satisfaction and immersion and in reference to 'Possibility of Film Education as Visual Culture Art Education: Understanding and Applying Mise-en-scene' in Journal of Research in Art Education [written by Ji-yeon Lee, Yoon-Kyung Chang and Ji-eun Kim (2019)], it showed that aesthetic elements are utilized as a way to express a value and an intention of a film, i.e., a video. An example thereof includes a type of a shot, a sequence of scenes for composing a story, mise-en-scene, etc. Accordingly, if it is possible to extract not only contents or a plot, but also a qualitative characteristic of a video, it is expected to have a positive impact on deriving a result which meets consumers' needs not only for watching a video but also for production.

In the present disclosure, as a technology utilized to extract a qualitative characteristic of a video, two technologies, i.e., a graph embedding technology which stores data in a graph structure and a deep neural network technology which may classify data in a graph structure by a deep learning network may be mainly utilized.

2. Description of Related Art

A conventional technology related to video understanding is focused on a technology related to video metadata tagging. For example, it automatically recognizes information on an object, a place, a background, etc. in a video and performs a task to understand a story context of a video. But, this technology has a limit in identifying a qualitative factor such as a social, cultural and artistic feature which has a major impact on determining a nature of a video. A factor which provides satisfaction and immersion when watching a video also includes a social, literary and artistic feature which determines feeling or emotion of a video. But, it is difficult to find an example of quantitatively extracting and utilizing this factor in the conventional art. Accordingly, the present disclosure proposes a method for extracting a qualitative factor from video data.

SUMMARY

A wide variety of components are known to be related to a consumption desire when a consumer accepts a commercially distributed video. Among them, a plot and mise-en-scene may be cited as an example of a component which may define a unique characteristic of a video. A plot refers to a method in which when there is a story conveyed in a video, it is described in a video. In other words, it is a method for showing a causal relationship based on an event in a story, and according to an arrangement method, a cause may be placed first or a result may be shown first. In addition, a video does not show the entire story it is trying to express, but allows a consumer watching it to infer it through an effect, a symbolic screen, etc. inserted according to a producer's intention. Genre, a concept often confused with a plot, is a concept which integrates a plot, a character, a background, a theme style, etc. and includes both a story and a visual element. Mise-en-scene originating from a French theatrical term meaning "put on the stage" refers to everything which is placed within a film frame. In other words, it is a concept saying what composes a screen including a background, a character, lighting, a costume, makeup and camera movement. Components on the screen have meaning beyond simple existence. This arrangement on the screen plays a role to emphasize a theme of a film and stimulate the audience's thought. Mise-en-scene in a film may be classified into filming mise-en-scene such as a camera movement, an angle, a composition, a screen aspect ratio and a depth, character mise-en-scene such as casting, costumes and makeup, acting, voice and a distance between characters, lighting mise-en-scene, set mise-en-scene, sound and music sound mise-en-scene, color mise-en-scene, texture mise-en-scene expressed through a tone of a screen, time mise-en-scene expressed through a length of cut and expansion and reduction of time and repetitive mise-en-scene expressed through repetition of a specific shot and props.

The present disclosure proposes a method for storing video data in a graph structure to include information as above and the above-described quantitative methodology for extracting a qualitative characteristic of a video by analyzing it with a graph neural network.

A method, a device and a computer-readable recording medium for extracting a qualitative characteristic of a video of the present disclosure may include segmenting a video into at least one video segment, and based on an edge representing a relationship between objects of the video segment and the objects, generating video graph sequences in a graph form of the video segment, and generation of the video graph sequences may be performed based on an object feature vector expressing a qualitative characteristic of the objects as a vector and an edge feature vector expressing a qualitative characteristic of the edge as a vector.

In a method, a device and a computer-readable recording medium for extracting a qualitative characteristic of a video of the present disclosure, the video graph sequences may be generated by a matrix operation of an object characteristic matrix and an object adjacency matrix.

In a method, a device and a computer-readable recording medium for extracting a qualitative characteristic of a video of the present disclosure, the object characteristic matrix may be a k×n matrix generated based on the object feature vector, the k may be the number of the objects and the n may be the number of features of the object feature vector.

In a method, a device and a computer-readable recording medium for extracting a qualitative characteristic of a video of the present disclosure, the object adjacency matrix may be a k×k matrix generated based on the edge feature vector.

In a method, a device and a computer-readable recording medium for extracting a qualitative characteristic of a video of the present disclosure, the method for extracting a qualitative characteristic of a video may further include classifying graph sequences having a similar qualitative characteristic from the video graph sequences to form one style.

In a method, a device and a computer-readable recording medium for extracting a qualitative characteristic of a video of the present disclosure, based on the style, it may further include generating a feature matrix by extracting an object feature vector and an edge feature vector having a value equal to or greater than a specific threshold value from video graph sequences having the same style among the video graph sequences.

In a method, a device and a computer-readable recording medium for extracting a qualitative characteristic of a video of the present disclosure, it may further include identifying a style of the video segment based on the style and storing the video segment in a database based on a style of the video segment.

In a method, a device and a computer-readable recording medium for extracting a qualitative characteristic of a video of the present disclosure, a qualitative characteristic of the objects may include a color, a texture, an age and a gender of the objects.

In a method, a device and a computer-readable recording medium for extracting a qualitative characteristic of a video of the present disclosure, a qualitative characteristic of the edge may include a geographical relationship and a behavioral relationship between the objects.

In a method, a device and a computer-readable recording medium for extracting a qualitative characteristic of a video of the present disclosure, the objects may include an object, a person and a background geographical feature which form the video segment.

Advantageous Effects

A result of a method proposed by the present disclosure may be viewed as two: (1) sets of video segments with a similar qualitative characteristic and (2) features composed of a node and an edge which define these sets. Information on this node and edge may be reproduced as information which may be utilized in a video industry by specifically describing a qualitative characteristic of a video.

For example, if you want to search for a video related to a director Park Chan-wook's style, a specific video of a director Park Chan-wook is targeted. A video style search service to which a method proposed in the present disclosure is applied finds a video with a feature similar to a location, a color and shading of an object, a relationship between characters and a relationship between props and a main character in a target video.

While the existing technology focuses on a simple context, i.e., a search technology such as 'a boy swims', a proposed technology helps search a video based on a qualitative characteristic such as 'a dark and grotesque video'. Accordingly, a proposed patent idea is expected to draw a meaningful result from applying it to a personalized video recommendation service, viewing a new video, a video search service for new video production, etc.

BRIEF DESCRIPTION OF DRAWINGS

FIG. 6 is a diagram showing an example in which a video is segmented in a semantic unit.

FIG. 7 is a diagram showing an example of an emotional word and statistics related to an emotional word.

FIG. 9 is a flow diagram showing a method for extracting a qualitative characteristic of a video.

DETAILED DESCRIPTION OF THE INVENTION

Figure 1:
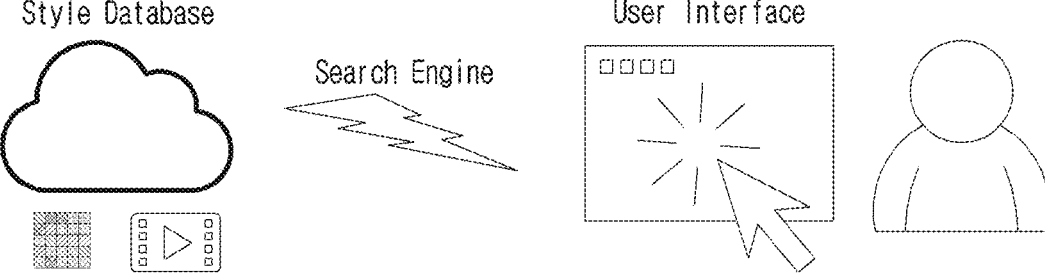
FIG. 1 is a diagram showing a video style search interface.

Hereinafter, in reference to the accompanying drawings, an embodiment of the present disclosure is described in detail so that a person with ordinary skill in the art to which the present disclosure pertains can easily perform it. But, the present disclosure may be implemented in several different forms and is not limited to an embodiment described herein.

In describing an embodiment of the present disclosure, when it is determined that a specific description for disclosure composition or function may cloud a gist of the present disclosure, a detailed description thereof is omitted. And, in a drawing, a part which is not related to a description for the present disclosure was omitted and a similar reference numeral was attached to a similar part.

In the present disclosure, when an element is referred to as being "linked", "coupled" or "connected" to another element, it may include not only a direct connection relationship, but also an indirect connection relationship that there is another element therebetween. In addition, when an element is referred to as "including" or "having" another element, it means that it may further include another element instead of excluding another element unless otherwise objected.

In the present disclosure, a term such as first, second, etc. is only used to distinguish one element from other element and does not limit order or importance, etc. between elements unless otherwise mentioned. Accordingly, within a scope of the present disclosure, a first element in an embodiment may be referred to as a second element in another embodiment and in the same way, a second element in an embodiment may be referred to as a first element in another embodiment.

In the present disclosure, elements distinguished each other are to clearly explain each feature and does not mean that elements are necessarily separated. In other words, a plurality of elements may be integrated and formed in a unit of one hardware or software or one element may be distributed and formed in a unit of a plurality of hardware or software. Accordingly, although it is not mentioned separately, such an integrated or distributed embodiment is also included in a scope of the present disclosure.

In the present disclosure, elements described in various embodiments do not necessarily mean essential elements and some may be an optional element. Accordingly, an embodiment composed of subsets of elements described in an embodiment is also included in a scope of the present disclosure. In addition, an embodiment which additionally includes another element in elements described in various embodiments is also included in a scope of the present disclosure.

FIG. 1 is a diagram showing a video style search interface.

Figure 2:
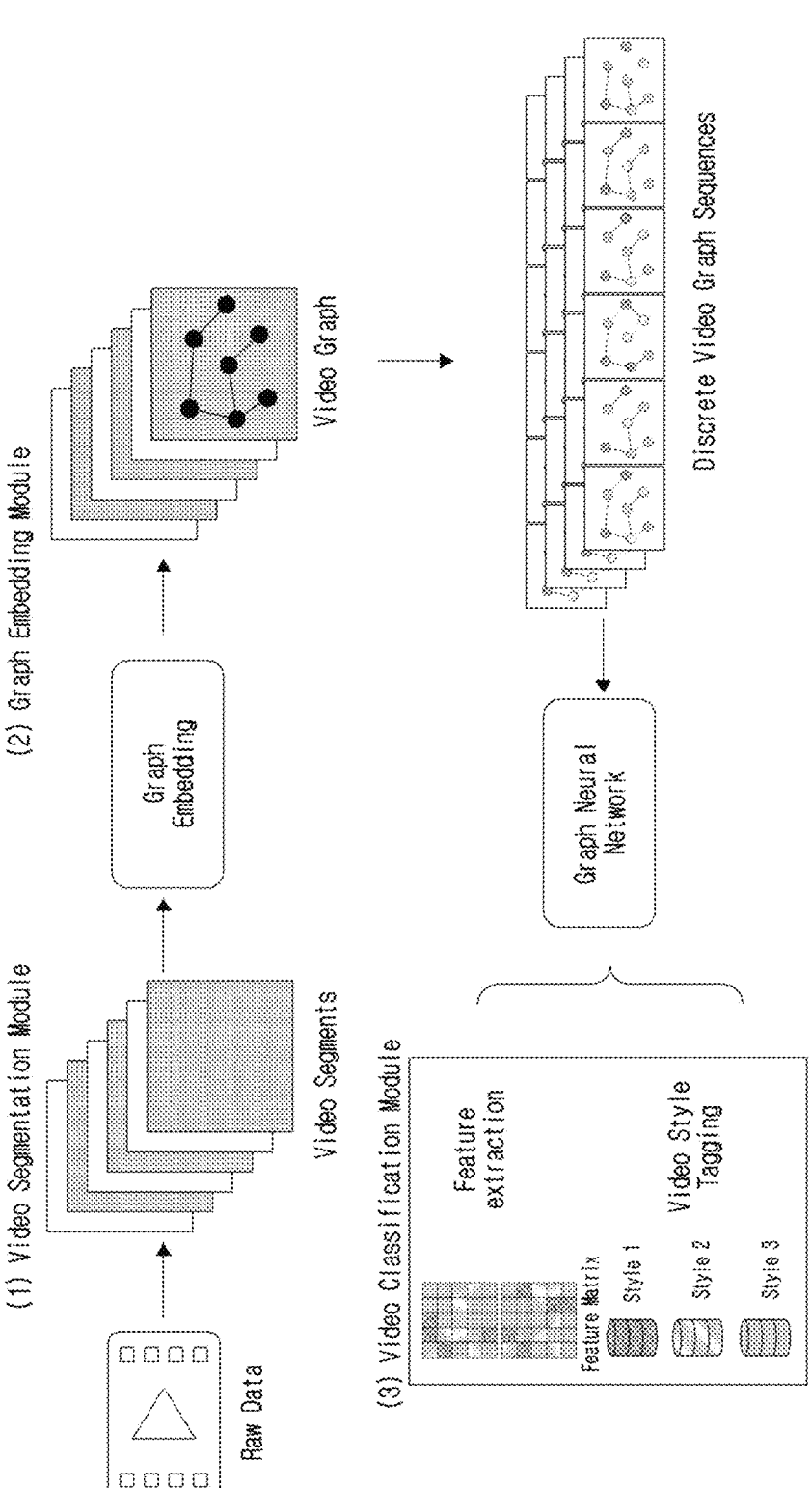
FIG. 2 is a conceptual diagram showing a method for extracting a qualitative characteristic of a video.

FIG. 2 is a conceptual diagram showing a method for extracting a qualitative characteristic of a video.

A method and a device for extracting a qualitative characteristic of a video of the present disclosure is composed of at least one of modules for extracting a qualitative characteristic of a video or a video style search interface.

Specifically, modules for extracting a qualitative characteristic of the video may include at least one of a video segmentation module which segments a video (1.Video Segmentation Module), a graph embedding module which stores a video segmented by the video segmentation module as data in a graph form (2.Graph Embedding Module) or a video classification module which classifies data stored in a graph form by the graph embedding module based on a qualitative characteristic (3.Video Classification Module).

1. Video Segmentation Module

A video segmentation module ((1) Video Segmentation Module in FIG. 2) may be a module which divides video data in a semantic unit (video segment). When a length of one video is long, it includes several stories, so it may be divided into segments first.

Figure 3:
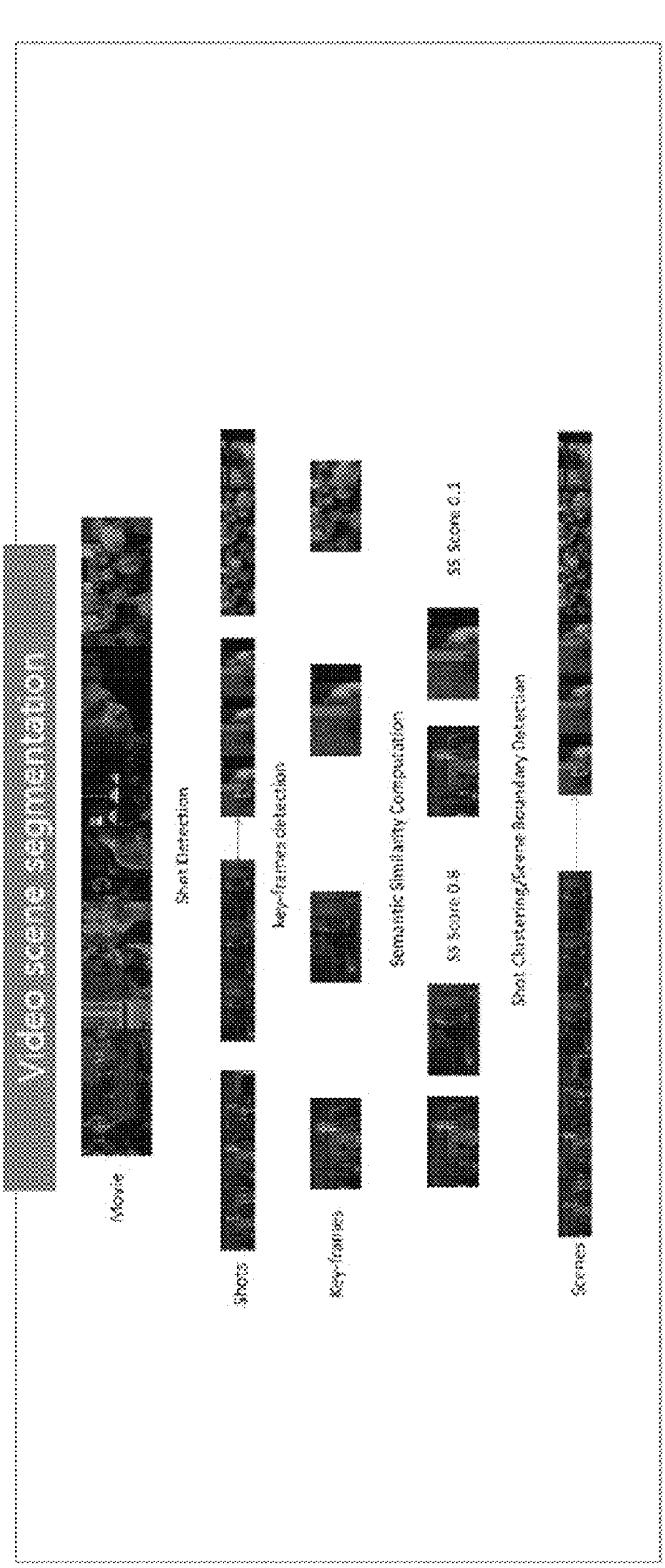
FIG. 3 is a diagram showing a method for segmenting a video scene based on a context.

FIG. 3 is a diagram showing a method for segmenting a video scene based on a context.

A semantic unit may be a unit in which a video is segmented by using a context-based video scene segmentation technology. In other words, a semantic unit may be a scenes unit of FIG. 3.

A graph embedding module ((2) Graph Embedding Module in FIG. 2) which stores a segmented video as data in a graph form may be a module which stores an object of video segments, a feature of an object (a color, a texture, etc.), color temperature and brightness of a video and a relationship between objects in a graph form.

(1) Graph Expression

A method of expressing a graph may be expressed as in Equation 1 below.

$$\text{Graph Expression } G=(V,\ E,\ X_V,\ X_E) \qquad \text{[Equation 1]}$$

A graph expression G may be expressed as at least one of a node expression V, an edge expression E, a feature vector expression of a node $X_V$ or a feature vector expression of an edge $X_E$.

(2) Node Expression

Anode (object) expression may be expressed as in Equation 2 below.

$$\text{Node Expression } V=\{v_1,v_2,\ \dots\ \} \qquad \text{[Equation 2]}$$

Here, v may mean an object which is recognized in one video, video segment, frame or scene that one video segment is divided at a proper time interval, which may include not only an object and a person but also an element composing a background (a geographic feature, sky, a wall of a closed space such as a house, a restaurant, etc.). Each element of a node expression v may have a specific value or may be expressed as a vector value or a matrix.

Here, $v_i$ represents a i-th object and i may be a natural number in a scope from 1 to the maximum number of objects in one video, video segment, frame or scene that one video segment is divided at a proper time interval.

(3) Edge Expression

An edge (existence/absence of a relationship between objects) expression may be expressed as in Equation 3 below.

$$\text{Edge Expression } E=\{e_1,\ e_2,\ \dots\ \}(e_i\in V\times V) \qquad \text{[Equation 3]}$$

Each element of an edge expression e may have a specific value or may be expressed as a vector value or a matrix.

Here, $e_j$ represents a j-th edge and j may be a natural number in a scope from 1 to the maximum number of relationships between objects.

As an example, when there are N objects in one video, video segment, frame or scene that one video segment is divided at a proper time interval, an edge expression may be expressed as a N×N matrix. For example, for N=2 (V={$v_1$, $v_2$}), an edge expression may be expressed in a form of a 2×2 matrix as in Equation 4 below.

$$E=\begin{Bmatrix} e_{11} & e_{12} \\ e_{21} & e_{22} \end{Bmatrix} \qquad \text{[Equation 4]}$$

Here, $e_{ab}$ may represent an edge (relationship) of an a-th object and a b-th object. Here, a and b may be a natural number in a scope from 1 to 'the total number of objects'. (a, b=1, . . . , (the total number of objects))

As an example, an edge expression may be expressed in the same way of rearranging an edge expression expressed as the matrix in an one-dimensional way. For example, when N is 2, an edge expression may be expressed as in Equation 5 below.

$$E=\{e_{11},e_{12},e_{21},e_{22}\} \qquad \text{[Equation 5]}$$

As an example, the one-dimensional edge expression may be expressed excluding a case such as a=b (an edge with itself) and a case in which duplication is performed regardless of order ($e_{ab}$ and $e_{ba}$ are overlapped) among elements ea b. For example, when N is 2, an edge expression may be expressed as in Equation 6 below.

$$E=\{e_{12}\} \text{ or } E=\{e_1\} \qquad \text{[Equation 6]}$$

In other words, in this case, the number of edges in an edge expression may be expressed as $_NC_2$. (C: Combination Function). For example, when N is 2, it may be (the number of edges)=(2×1)/(2×1)=1.

In summary, when the number of objects in one video, video segment, frame or scene that one video segment is divided at a proper time interval is N, an edge expression may be expressed as in Equation 7 below.

$$E=\{e_1,e_2,\ \dots\ ,e_K\}(K=_NC_2) \qquad \text{[Equation 7]}$$

(4) Feature Vector Expression of Node

A feature (a color, a texture, an age, a gender, etc. of an object) vector expression of a node (an object) may be expressed as in Equation 8 below.

$$\text{Feature Vector Expression of Node } X_v=\{x_1,\ x_2,\ \dots\ , X_{|V|}\} \qquad \text{[Equation 8]}$$

Each element of a feature vector expression of a node x may have a specific value or may be expressed as a vector value or a matrix.

Here, v may be a natural number in a scope from 1 to the maximum number of nodes (objects).

Here, a feature of a node may be expressed as an element indicating a qualitative characteristic of a video. For example, it may mean a color, brightness and a texture of an object or whether it is female or male when an object is a person.

(5) Feature Vector Expression of Edge

A feature (a geographical and behavioral relationship, etc. between objects) vector expression of an edge may be expressed as in Equation 9 below.

$$\text{Feature Vector Expression of Edge } X_e = \{x_1, x_2, \dots, x_{(|E|)}\} \quad \text{[Equation 9]}$$

Each element of a feature vector expression of an edge x may have a specific value or may be expressed as a vector value or a matrix.

Here, E may be a natural number in a scope from 1 to the maximum number of edges (relationships).

An edge may feature all information which may exist between nodes.

If an edge expression (see Equation 3) represents whether there is a relationship between nodes, a feature vector expression of an edge (see Equation 9) may represent a relationship which may exist between nodes. For example, the relationship may include a positional relationship such as 'is on', 'is in', 'have', etc. and a feature related to an action such as 'carry' or 'throw'.

Figure 4:
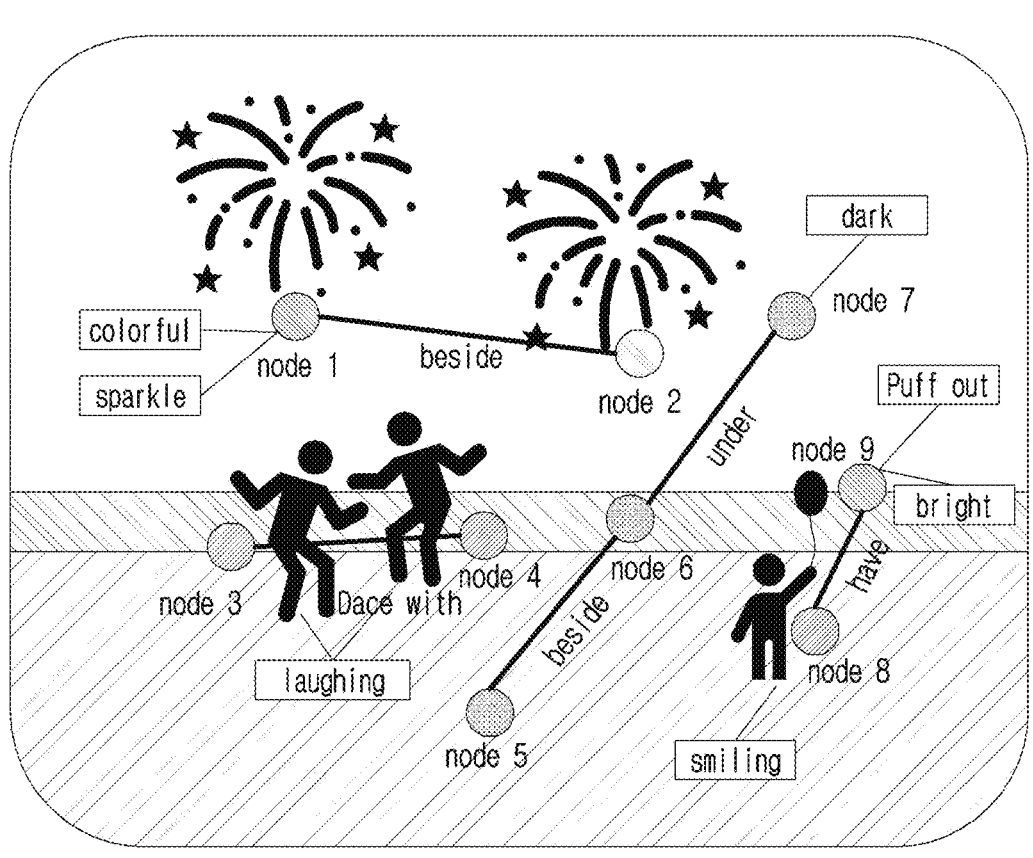
FIG. 4 is a diagram showing an example of video graph embedding.

FIG. 4 is a diagram showing an example of video graph embedding.

Looking at an embodiment of FIG. 4, it is as follows.

First, a node (an object) may include a person (node 3, 4, 8), may include an object or a geographic feature (node 1, 2, 9) and may include nodes distinguished according to a color of a background (nodes 5, 6, 7).

A feature of a node may be 'colorful' and 'sparkle' for node 1 and may be 'dark' for node 7. One node may have a plurality of features and a feature of a node may vary depending on a type of a node. In addition, a feature of a node may be expressed based on an index value obtained from a database or a table which predefines a feature of a node.

A feature of an edge may be 'Dance with' for an edge of node 3 and node 4 and may be 'have' for an edge of node 8 and node 9. One edge may have a plurality of features and a feature of an edge may vary depending on at least one type of an edge or a node. In addition, a feature of an edge may be expressed based on an index value obtained from a database or a table which predefines a feature of an edge.

A feature of a node or an edge may further include information on a degree of a corresponding feature. As an example, when a feature of a node is 'dark' and a degree of dark is expressed between 1 and 100, a feature of a node may be expressed as dark30 (darkness of about 30), etc.

2. Graph Embedding Module

When a graph embedding module ((2) Graph Embedding Module in FIG. 2) is expressed in a graph of video segments, a video is consecutive data, but it is discretized with a proper frequency and expressed as a graph sequence. This graph sequence may be utilized as a feature representing context information of a video. As a result, one video may be expressed as a set of graphs (Discrete Video Graph Sequences in FIG. 2) extracted from a scene where a short video divided into video segments is extracted at a proper time interval. In this case, a standard for scene extraction may be a video encoding frame or a time interval defined by a user as being proper (e.g., an interval of 1 second).

Figure 5:
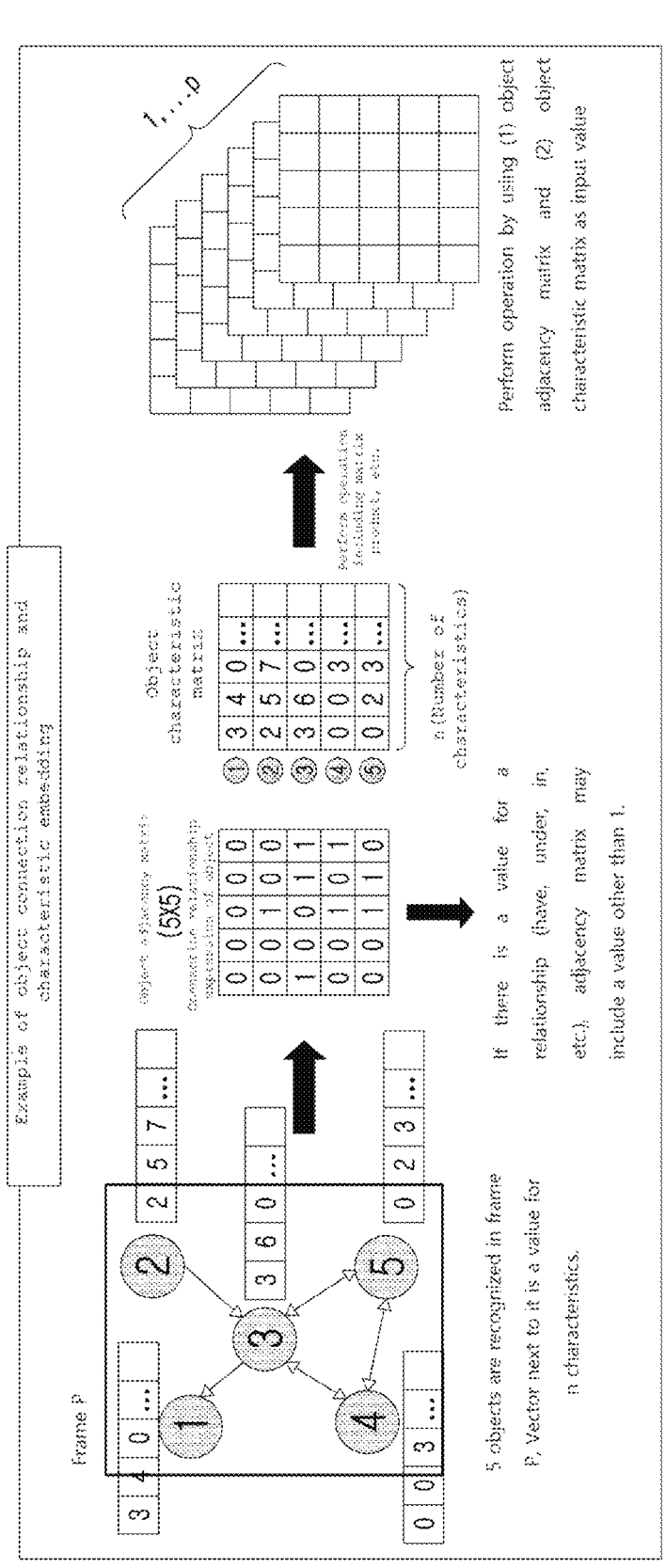
FIG. 5 is a diagram showing an embodiment for a graph embedding method.

FIG. 5 is a diagram showing an embodiment for a graph embedding method.

An object may be recognized in one video segment composed of at least one frame. In reference to FIG. 5, 5 objects may be recognized in one frame p included in a video segment. Each object may have a characteristic of an object in a vector form. In reference to FIG. 5, a first object may have a value of $\{3, 4, 0, \dots\}$ and a second object may have a value of $\{2, 5, 7, \dots\}$. An object characteristic matrix ('the number of objects'x'n characteristics') may be generated based on an object and a characteristic of an object. In reference to FIG. 5, since there are 5 objects of frame p and n characteristics of an object, a 5×n object characteristic matrix may be generated for frame p.

In addition, an object adjacency matrix expressing a connection relationship between objects may be generated from objects. In reference to FIG. 5, since there are 5 objects, a connection relationship between objects may be expressed as a 5×5 matrix. Here, if there is a relationship, a value for a relationship of the matrix may have 1. When the relationship exists and a relationship has a characteristic such as have, under, in, etc., a value for a relationship of the matrix may have a value other than 1.

In addition, a qualitative characteristic of a frame may be expressed in a matrix form by performing an operation for both matrixes (matrix product, etc.) based on an object adjacency matrix and an object characteristic matrix. As a semantic unit (video segment) includes at least one frame, a matrix by the matrix operation is generated per each frame, so video graph sequence data for the semantic unit may be generated. Here, order of generated video graph sequence data may be the same as order of playing a frame, an input value.

Figure 6:
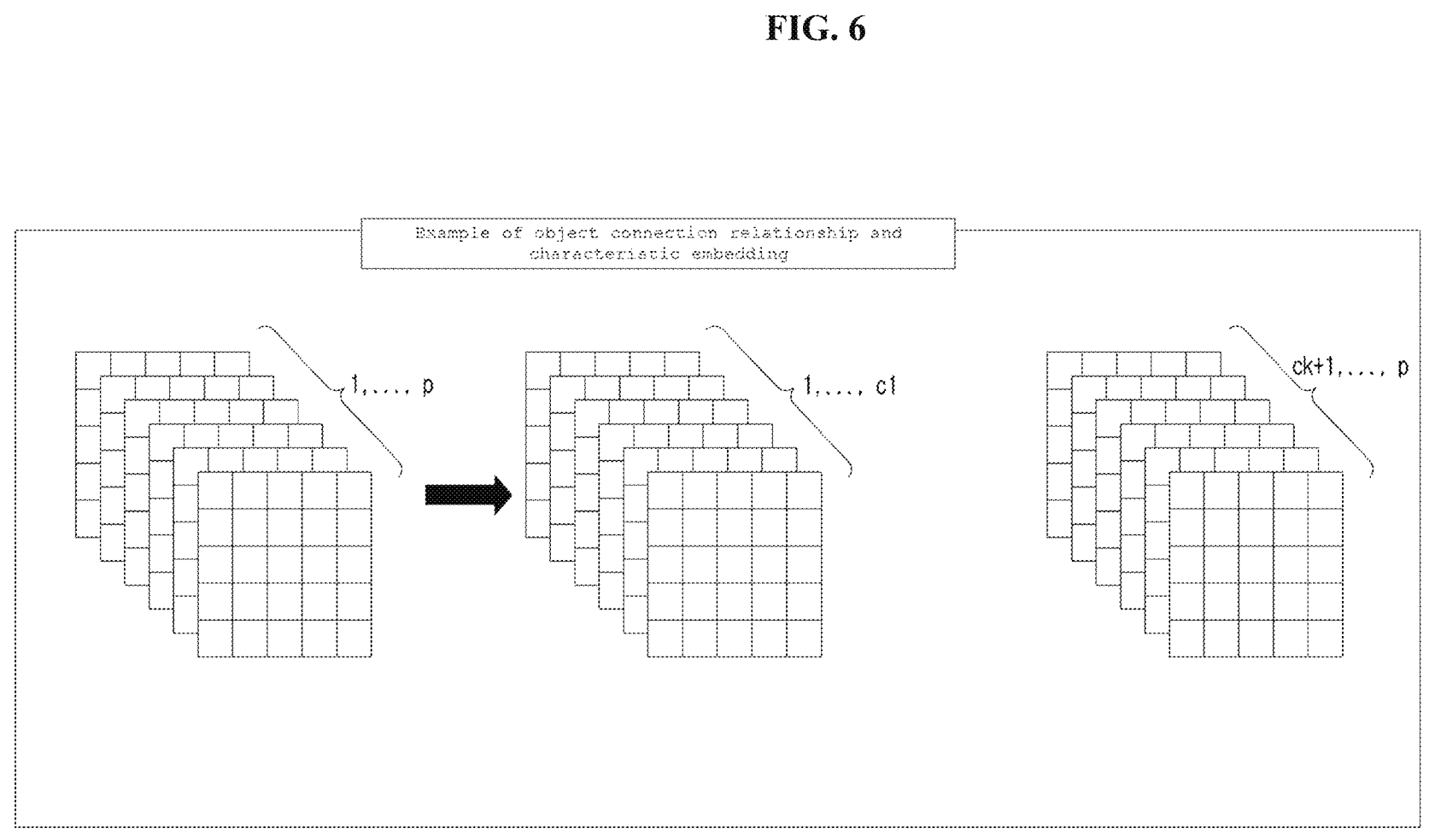

FIG. 6 is a diagram showing an example in which a video is segmented in a semantic unit.

In reference to FIG. 6, a target video composed of p frames may be segmented in a semantic unit (video segment) by a context-based video scene segmentation method of FIG. 3.

Each semantic unit may be composed of some frames belonging to the entire frame scope (1~p). As an example, a first semantic unit may have a frame of 1~c1 and a second semantic unit may have a frame of c1+1~c2. Here, both c1 and c2 may be included in a frame scope of 1~p.

As an example, a first semantic unit has a frame of 1~c1, so video graph sequence data composed of c1 matrixes may be obtained by a graph embedding method. A second semantic unit has a frame of c1+1~c2, so video graph sequence data composed of c2~c1 matrixes may be obtained.

3. Video Classification Module

A video classification module may be composed of a feature extraction unit which extracts a feature from graph sequence data and a video style tagging unit which identifies and stores video segments by classification.

A video classification module may utilize a graph neural network to classify graph sequences in FIG. 2 so that graph sequences with a similar qualitative characteristic form one style. In other words, graph sequences may be classified into graph sequences with a similar qualitative characteristic like $style_1, style_2, \dots, style_n$.

A feature extraction unit (Feature Extraction in FIG. 2) may extract feature information on a node and an edge which have a confidence value equal to or greater than a specific threshold value per each style group.

A video style tagging unit (Video Style Tagging in FIG. 2) may store video segments obtained by cutting a video reconstructed by decoding a video that the feature information is extracted in a semantic unit in a database (a video style database) per style group.

FIG. 7 is a diagram showing an example of an emotional word.

Video style tagging may be performed in a natural language. As an example, it may be performed in a natural language such as 'active', 'exciting', etc. Although emotion is the same, an expression method of a natural language may be different according to a difference in a processing program or a user's expression method. As an example, a natural language for 'active' may be also expressed as a natural language such as 'energetic', 'exciting', etc. according to a difference in a processing program or a user's expression method. This natural language may be mapped to an emotional word defined in an emotional word dictionary (e.g., KNU Korean emotional word dictionary), etc. based on a similarity between a natural language and an emotional word. In other words, although it is expressed in a different natural language, it may be mapped to one emotional word. In reference to FIG. 7, expression of a natural language including a word 'love' may be mapped to a n-gram positive/negative word, an emotional word.

Such an emotional word may be also used in a search engine which will be described later. As an example, when a user inputs a natural language, it is converted into an emotional word, so search may be performed by comparing it with an emotional word connected to a natural language of a video. As another example, when a user inputs an emotional word, search may be performed by comparing it with an emotional word connected to a natural language of a video.

An emotional word mapped to the tagged natural language may be stored in a database which stores video style tagging. Since classification of an emotional word varies depending on an emotional word dictionary, the emotional word may be classified and stored according to an emotional word dictionary.

Lastly, a video style database stored by a video style tagging unit may be accessed and searched by a user such as a user or personal terminal, etc. by using a natural language, a video and an image search engine implemented with the conventional search technology through an interface device (see FIG. 1). As described above, search may be performed through an emotional word instead of a natural language.

Figure 8:
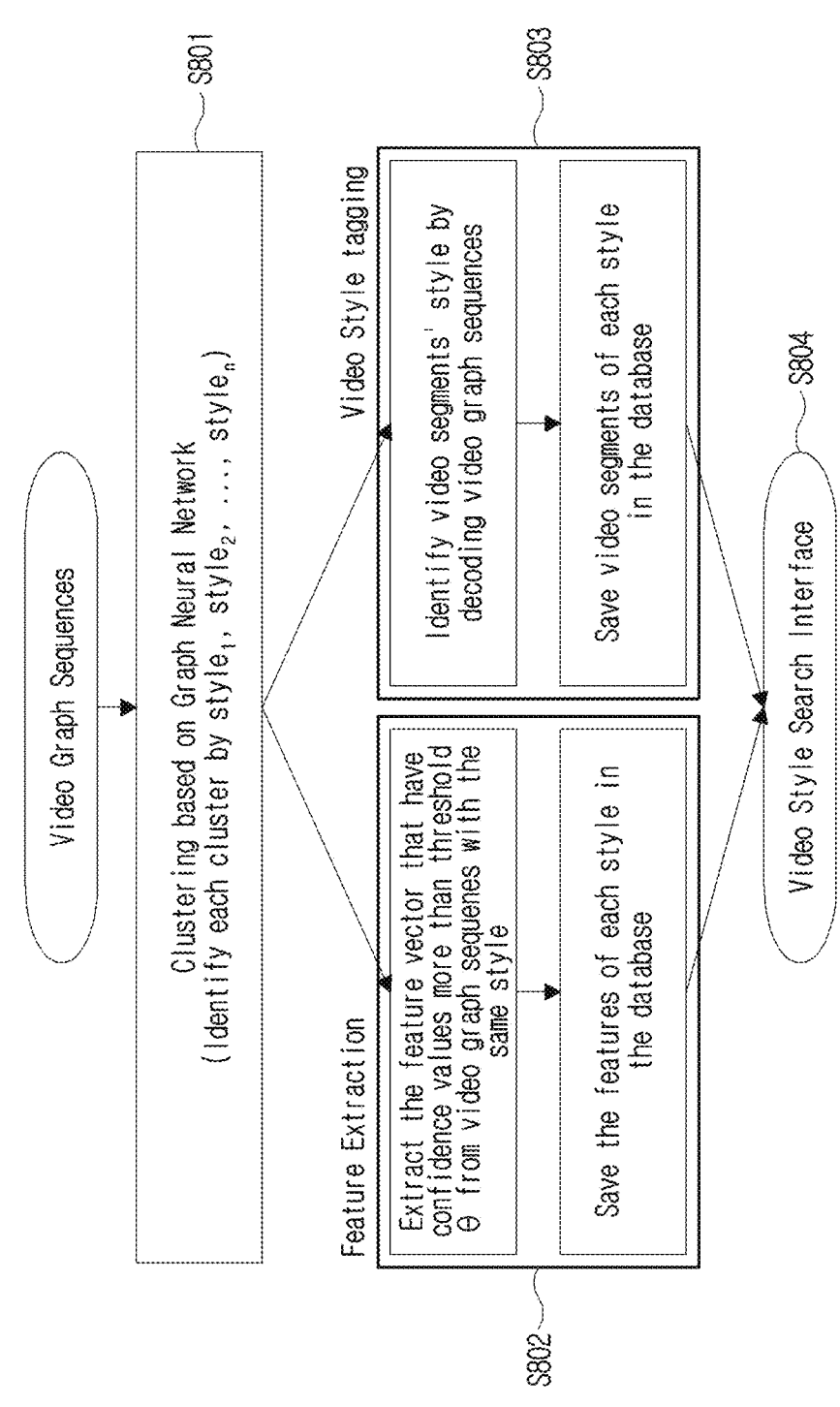
FIG. 8 is a diagram showing a video classification method.

FIG. 8 is a diagram showing a video classification method.

First, in a graph sequence classification step S801, graph sequences may be classified by utilizing a graph neural network so that graph sequences with a similar qualitative characteristic form one style. In other words, graph sequences may be classified into graph sequences with a similar qualitative characteristic like $style_1$, $style_2$, . . . , $style_n$.

In a feature extraction step S802, a feature matrix may be generated by extracting a feature vector (=feature information) for a node and an edge having a confidence value equal to or greater than a specific threshold value from a graph sequence of the same style based on the classified style.

In a video style tagging step S803, a style of a video segment may be identified by decoding graph sequences based on the classified style. In addition, according to the identification, video segments of each style may be stored in a database.

In a video style search step S808, based on at least one of the feature matrix or the database, a user such as a user or personal terminal, etc. may access and search a video or a video segment by using a natural language, a video and an image search engine implemented with the conventional search technology through an interface device. In addition, search may be performed by using an emotional word described above.

FIG. 9 is a flow diagram illustrating a method for extracting a qualitative characteristic of a video according to an embodiment of the present disclosure, including dividing a video into at least one video segment and generating a video graph sequence in a graph form of the video segment based on an object feature vector and an edge feature vector, the object feature vector expressing qualitative characteristics of the objects as a vector and the edge feature vector expressing qualitative characteristics of the edge as a vector.

A method for extracting a qualitative characteristic of a video according to an embodiment of the present disclosure may be implemented by a computer-readable recording medium including a program instruction for performing a variety of operations implemented by a computer. The computer-readable recording medium may include a program instruction, a local data file, a local data structure, etc. alone or in combination. The recoding medium may be specially designed and configured for an embodiment of the present disclosure or may be available by being notified to those skilled in a computer software art. An example of a computer-readable recoding medium includes magnetic media such as a hard disk, a floppy disk and a magnetic tape, optical recording media such as a CD-ROM and a DVD, magneto-optical media such as a floptical disk and a hardware device which is specially configured to store and execute a program instruction such as ROM, RAM, a flash memory, etc. The recording medium may be a transmission medium such as an optical or metal line, a waveguide, etc. including a carrier which transmits a signal designating a program instruction, a local data structure, etc. An example of a program instruction may include not only a machine language code as generated by a compiler, but also a high-level language code which may be executed by a computer with an interpreter, etc.

A description above is just an illustrative description of a technical idea of the present disclosure and a person with ordinary skill in the art to which the present disclosure pertains will be able to make various modifications and variations without departing from an essential characteristic of the present disclosure. In addition, embodiments disclosed in the present disclosure are not to limit a technical idea of the present disclosure, but to describe it, and a scope of a technical idea of the present disclosure is not limited by these embodiments. Accordingly, a scope of protection of the present disclosure should be interpreted by a claim below and all technical ideas within a scope equivalent thereto should be interpreted as being included in a scope of a right of the present disclosure.

What is claimed is:

1. A method for extracting a qualitative characteristic of a video, the method comprising:

dividing a video into at least one video segment;

generating, for each video segment, based on objects included in the video segment and edges representing relationships among the objects, a video graph sequence in a graph form of the video segment, wherein generating the video graph sequence includes generating an object feature vector expressing qualitative characteristics of the objects as a vector and an edge feature vector expressing a qualitative characteristic of each edge as a vector;

embedding each generated video graph sequence into a structured graph representation suitable for processing by a graph neural network;

classifying, using the graph neural network, each embedded representation of the video graph sequence into a qualitative characteristic;

grouping a plurality of video graph sequences having similar qualitative characteristics into a single style; and based on the style, generating a feature matrix by extracting the object feature vector and the edge feature vector having a value equal to or greater than a specific threshold value from video graph sequences belonging to a same style.

2. The method of claim 1, wherein the video graph sequence is generated by a matrix operation of an object characteristic matrix and an object adjacency matrix.

3. The method of claim 2, wherein the object characteristic matrix is a k×n matrix generated based on the object feature vector, the k is a number of the objects, the n is a number of features of the object feature vector.

4. The method of claim 3, wherein the object adjacency matrix is a k×k matrix generated based on the edge feature vector.

5. The method of claim 1, further comprising:

identifying a style of the video segment based on the classified qualitative characteristic; and storing the video segment in a database based on the identified style of the video segment.

6. The method of claim 1, wherein the qualitative characteristic of the objects includes a color, a texture, an age and a gender of the objects.

7. The method of claim 1, wherein the qualitative characteristic of the edge includes a geographical relationship and a behavioral relationship between the objects.

8. The method of claim 1, wherein the objects include an object, a person and a background geographical feature which form the video segment.

9. A non-transitory computer-readable recording medium, wherein a computer program for executing a method according to claim 1 in a computer is recorded.

10. A device for extracting a qualitative characteristic of a video, the device comprising:

a processor; and a memory having instructions stored thereon, which, when executed by the processor, cause the processor to perform:

a video segmentation module which divides a video into at least one video segment; and a graph embedding module which generates, for each video segment, a video graph sequence in a graph form of the video segment based on objects included in the video segment and edges representing relationships among the objects, and embeds each generated video graph sequence into a structured graph representation suitable for processing by a graph neural network, wherein the video graph sequence is generated based on an object feature vector expressing qualitative characteristics of the objects as a vector and an edge feature vector expressing a qualitative characteristic of each edge as a vector;

a video classification module which classifies, using the graph neural network, each embedded representation of the video graph sequence into a qualitative characteristic, groups a plurality of video graph sequences having similar qualitative characteristics to into a single style, and based on the style, generates a feature matrix by extracting the object feature vector and the edge feature vector having a value equal to or greater than a specific threshold value from video graph sequences belonging to a same style.

11. The device of claim 10, wherein the video graph sequence is generated by a matrix operation of an object characteristic matrix and an object adjacency matrix.

12. The device of claim 11, wherein the object characteristic matrix is a k×n matrix generated based on the object feature vector, the k is a number of the objects, the n is a number of features of the object feature vector.

13. The device of claim 12, wherein the object adjacency matrix is a k×k matrix generated based on the edge feature vector.

14. The device of claim 10, wherein the video classification module includes a video style tagging unit which identifies a style of the video segment based on the classified qualitative characteristic and stores the video segment in a database based on the identified style of the video segment.

15. The device of claim 10, wherein the qualitative characteristic of the objects includes a color, a texture, an age and a gender of the objects.

16. The device of claim 10, wherein the qualitative characteristic of the edge includes a geographical relationship and a behavioral relationship between the objects.

* * * * *